(12) United States Patent
Pellegrini

(10) Patent No.: US 9,945,605 B2
(45) Date of Patent: Apr. 17, 2018

(54) PROCESS FOR THE REMOVAL OF $CO_2$ FROM ACID GAS

(71) Applicants: STAMICARBON B.V., Sittard (NL);
Laura Annamaria Pellegrini, Alzano Lombardo (BG) (IT)

(72) Inventor: Laura Annamaria Pellegrini, Alzano Lombardo (IT)

(73) Assignees: TECNIMONT S.P.A., Milan (IT);
Laura Annamaria Pellegrini, Alzano Lombardo (IT)

( * ) Notice: Subject to any disclaimer, the term of this patent is extended or adjusted under 35 U.S.C. 154(b) by 0 days.

(21) Appl. No.: 14/432,726

(22) PCT Filed: Oct. 1, 2013

(86) PCT No.: PCT/NL2013/050698
§ 371 (c)(1),
(2) Date: Mar. 31, 2015

(87) PCT Pub. No.: WO2014/054945
PCT Pub. Date: Apr. 10, 2014

(65) Prior Publication Data
US 2015/0276308 A1     Oct. 1, 2015

(30) Foreign Application Priority Data

Oct. 1, 2012 (EP) .................................... 12186850

(51) Int. Cl.
*F25J 3/02* (2006.01)
*C07C 7/04* (2006.01)
*C10L 3/10* (2006.01)

(52) U.S. Cl.
CPC ............. *F25J 3/0266* (2013.01); *C10L 3/102* (2013.01); *C10L 3/103* (2013.01); *C10L 3/104* (2013.01);
(Continued)

(58) Field of Classification Search
CPC .......... F25J 3/0209; F25J 3/0266; F25J 3/061; F25J 3/0635; F25J 3/067; F25J 2220/66
See application file for complete search history.

(56) References Cited

U.S. PATENT DOCUMENTS 2,888,807 A    6/1959  Bocquet
4,762,543 A    8/1988  Pantermuehl et al.
(Continued)

FOREIGN PATENT DOCUMENTS

DE    26 22 662       12/1976
FR    2 312 001     * 5/1975

OTHER PUBLICATIONS

Translation of Snamprogetti.*
(Continued)

*Primary Examiner* — John F Pettitt
(74) *Attorney, Agent, or Firm* — Morrison & Foerster LLP

(57) ABSTRACT

The invention relates to a process for the removal of $CO_2$ from acid gas by cryogenic distillation performed in two steps. The feed mixture is first distilled at high pressure (at least 45 bar) in a first distillation column. The top product or a part thereof is then, after heating, subjected to a second distillation step at a lower pressure (lower than 45 bar). The top product of the second distillation step is methane of high purity (more than 99 mol. %). The bottom product of the second distillation step is recycled back to the first distillation column. The method according to the invention allows complete separation of methane also at higher level of acidic components, is economical and does not result in solid $CO_2$ build-up, which is a common problem in cryogenic distillation.

13 Claims, 3 Drawing Sheets

(52) U.S. Cl.
CPC ........... *F25J 3/0209* (2013.01); *F25J 3/0233* (2013.01); *F25J 2200/04* (2013.01); *F25J 2200/08* (2013.01); *F25J 2200/40* (2013.01); *F25J 2200/74* (2013.01); *F25J 2200/78* (2013.01); *F25J 2210/66* (2013.01); *F25J 2220/66* (2013.01); *F25J 2235/60* (2013.01); *Y02C 10/12* (2013.01)

(56) References Cited

U.S. PATENT DOCUMENTS

| | | | | |
|---|---|---|---|---|
| 5,062,270 | A | * 11/1991 | Haut | F25J 3/0209 62/629 |
| 5,335,504 | A |   8/1994 | Durr et al. | |
| 5,970,742 | A | * 10/1999 | Agrawal | B01D 3/146 62/630 |
| 6,116,050 | A | *  9/2000 | Yao | F25J 3/0209 62/630 |
| 2012/0060554 | A1 | *  3/2012 | Schmidt | C10L 3/105 62/620 |

OTHER PUBLICATIONS

International Search Report and Written Opinion for PCT/NL2013/050698, dated Jan. 23, 2015, 12 pages.
Schianni, "Cryogenic Removal of Carbon Dioxide from Natural Gas," Natural Gas Processing and Utilisation: [Proceedings of] An International Conference Organised by the Irish Group of the Institution of Chemical Engineers with the Co-operation and Assistance of the Institution of Engineers of Ireland (1976) 44(1):50-55.

\* cited by examiner

PROCESS FOR THE REMOVAL OF $CO_2$ FROM ACID GAS

CROSS-REFERENCE TO RELATED APPLICATIONS

This application is the national phase of PCT application PCT/NL2013/050698 having an international filing date of 1 Oct. 2013, which claims benefit of European patent application No. 12186850.9 filed 1 Oct. 2012. The contents of the above patent applications are incorporated by reference herein in their entirety.

FIELD OF THE INVENTION

The invention relates to the field of purification of acid gas and in particular to the removal of carbon dioxide from acid gas by cryogenic distillation.

BACKGROUND OF THE INVENTION

The invention addresses the problem of the removal of carbon dioxide from its mixtures with methane such as acid gas. Acid gas is natural gas containing acidic gas components such as carbon dioxide ($CO_2$) and hydrogen sulphide ($H_2S$).

About 40% of the world natural gas reservoirs contain significant concentrations of carbon dioxide and hydrogen sulphide. Such acid gas fields are found in Europe, Africa, North and South America and the Far East; the Middle East and Central Asia hold the largest volumes. In order to efficiently use the hydrocarbons from acid gas, the acidic components $CO_2$ and $H_2S$ need to be removed. In the last years the efforts for the development of new technologies that can make the exploitation of these reserves economically convenient are increased. At the same time, international and local environmental regulations push towards an increasing limitation of the $CO_2$ emissions to the atmosphere.

For the exploitation of an acid gas field, the key economic driver is the cost to separate and recover the acid gas components ($CO_2$, $H_2S$). The traditional chemical separation of $CO_2$ and $H_2S$ with amines is not competitive when the stream contains high quantity of acidic components because this involves high costs proportional to the quantity of the components to be removed. Another problem is that in the known separation processes components $CO_2$ and $H_2S$ are separated as low pressure vapours, therefore leading to high recompression costs for re-injection.

In the prior art cryogenic processes are known and used for the separation of carbon dioxide from methane in an acid gas. A problem during cryogenic distillation is however the build-up of solid carbon dioxide inside the distillation column. In the prior art, two cryogenic processes are known and currently used in industrial applications wherein the build-up is avoided. These are the Ryan Holmes process described in U.S. Pat. No. 4,318,723 and the CFZ (Controlled Freeze Zone) process described in U.S. Pat. No. 4,533,372.

In the Ryan Holmes process the build-up of solid carbon dioxide is addressed by adding to the natural gas a third component (usually a C3-C6 hydrocarbon) that prevents the carbon dioxide solidification inside the distillation column. Therefore this added component has to be separated from the bottom product of the cryogenic distillation in a regeneration unit. The addition of a third component (to be added and separated) leads to an increase of investment costs (CAPEX) and operating costs (OPEX).

The CFZ process is based on a complex cryogenic distillation column. Carbon dioxide solidification is allowed in a specific zone of the column, the controlled freeze zone, where the deposited solid $CO_2$ has to be molten and extracted. The process requires an ad-hoc designed column. The use of a complex solid-liquid separation column, with an ad-hoc design, leads to an increase of CAPEX and OPEX costs.

Other processes are described, for example, in U.S. Pat. No. 4,284,423 which is a process for the separation of $CO_2$ from methane by distillation wherein the gas mixture is fed first to a low pressure column and subsequently to a high pressure column. The stream from the low pressure column needs to be compressed and cooled before entering the high pressure column. After reproduction of the exemplified processes with commercial process simulators, it is found that this process leads to the formation of solid $CO_2$.

DE2622662 discloses a distillation process for the separation of $CO_2$ from methane wherein the top product from a high-pressure distillation column is cooled and completely condensed and subsequently fed to a second column operating at a lower pressure. Reproduction of the exemplified processes with commercial process simulators shows that the simulation of this process does not reach convergence.

It is therefore desirable to provide a process for the removal of $CO_2$ from acid gas which would not have the above-mentioned drawbacks. In particular, the process should achieve complete separation of methane also at a high level of acidic components, avoid solid $CO_2$ precipitation and moreover be economical.

SUMMARY OF THE INVENTION

In order to better address one or more of the foregoing desires, the invention presents, in one aspect, a process for the removal of $CO_2$ from a feed mixture comprising methane and $CO_2$, the process comprising:

(a) subjecting the feed mixture to a first distillation step in a first distillation column or a first section of a distillation column, at a pressure of at least 45 bar, yielding after distillation a first bottom product, stream comprising $CO_2$ and a first top product stream comprising $CO_2$ and methane, (b) heating said first top product stream or a part of said first top product stream to yield a heated first top product stream respectively a heated part of said first top product stream, wherein heating is done to a temperature higher than the dew point of the stream at the pressure of the subsequent second distillation step, (c) subjecting the heated first top product stream or the heated part of said first top product stream, respectively, to a second distillation step in a second distillation column or a second section of the distillation column, at a pressure lower than 45 bar, yielding thereby a second top product stream comprising methane and a second bottom product stream, (d) feeding said second bottom product stream to said first distillation column or said first section of the distillation column.

DETAILED DESCRIPTION OF THE INVENTION

Figure 1:
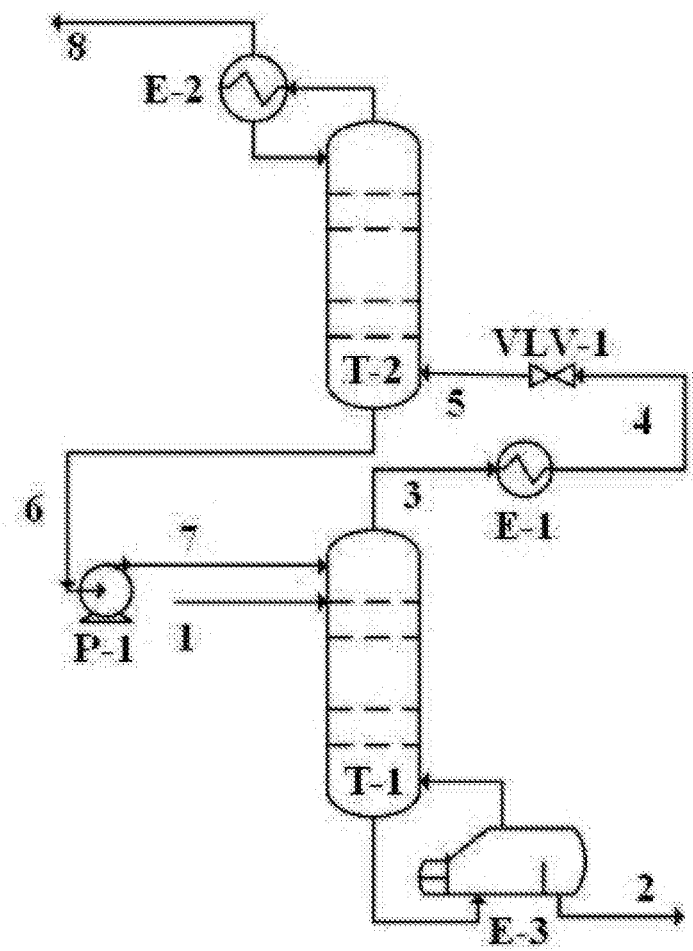
FIG. 1 shows a process scheme for an embodiment according to the invention.

The present invention relates to a cryogenic distillation process wherein use is made of a loop process including two distillation steps at a different pressure with an intermediate heating step. In the first step a feed mixture is distilled at a predetermined high pressure and, after heating of at least a part of it, the resulting top stream is distilled at a predetermined low pressure. This process yields a substantially pure stream of methane as a top stream, while the bottom stream comprising $CO_2$ and other components is recycled back to the first distillation step. Since methane is obtained as a pure stream, the method of the invention is also a method for the separation, or purification, of methane from its mixtures with $CO_2$.

In the method of the invention, a feed mixture comprising $CO_2$ and methane is provided. There is no particular limit on the content of $CO_2$ that may be present and the present method can treat gas mixtures with high amounts of $CO_2$. In a preferred embodiment, the feed mixture is acid gas, that is, natural gas containing acidic components $CO_2$ and $H_2S$. Depending on the origin, the acid gas can contain up to 80 mol. % $CO_2$ and different amounts of $H_2S$. Apart from acidic components and methane, acid gas may contain small amounts of higher hydrocarbons, such as ethane and propane. The amount of hydrogen sulphide and hydrocarbons in the feed mixture is not considered critical since these components do not cause the problem of solidification. In another embodiment, the feed mixture can be biogas. Biogas refers to a gas obtained by breakdown of organic matter in the absence of oxygen and mainly contains methane and $CO_2$.

In step (a) the feed mixture is subjected to a first distillation step in a first distillation column or a first section of a distillation column, at a pressure of at least 45 bar, yielding after distillation a first bottom product stream comprising $CO_2$ and a first top product stream comprising $CO_2$ and methane. The first, high pressure distillation step is performed at a pressure such that solid carbon dioxide does not form in the upper part of the section. Preferably, the pressure during the first distillation step is in the range 45-55 bar, typically around 50 bar. The temperature of the feed stream entering the first distillation step is preferably about its dew point temperature at given pressure, or can be lower. It is advantageous if the temperature is below the dew temperature of the mixture because in this way the reflux ratio in the low pressure column is reduced and consequently also the section of the column is smaller.

This step is performed in a first distillation column, but it is also possible to use a distillation column with at least two sections operating at different pressure and to carry out the first distillation step in a section with a high pressure of such distillation column. In this case, the high pressure section of the distillation column operates at a pressure of at least 45 bar, preferably in the range 45-55 bar, typically around 50 bar.

The first bottom product stream contains predominantly $CO_2$. Since $CO_2$ is obtained at a high pressure, it can advantageously be used for further purposes in contrast to the conventional treatment wherein $CO_2$ is absorbed using amines. Preferably, a reboiler is located at the bottom of the first section of the distillation column or the first distillation column. The first top product stream comprising $CO_2$ and methane, with an increased content of methane, is subjected after heating to a second distillation step. In step (b) said first top product stream or a part of it is heated to a temperature that is higher than the dew point of the mixture at the pressure of the subsequent second distillation step, thereby yielding a heated first top product stream (or a heated part of said first top product stream). Heating is used herein to mean any increase in temperature of the product stream, also including superheating which means heating to a temperature above the dew point of a mixture at a given pressure. The temperature to which the first top product stream or its part is heated is determined by the dew point of the mixture at the pressure of the second distillation step. In order to avoid solid $CO_2$ formation in the stream entering the second distillation step, the product stream or its part is heated to a temperature higher than the dew point of the mixture at the pressure of the second distillation step, preferably 1-10° C., more preferably 3-8° C. higher than the dew point.

In one embodiment, only a part of the first top product stream is heated. Preferably, the part to be heated is at least 10 mol. % of the total first top product stream, more preferably, at least 20 mol. %. The remaining, non-heated part of said first top product stream is preferably also fed to the second distillation column or the second section of the distillation column. This remaining, non-heated part is preferably fed into the distillation section or column at a location above the location where the heated part of the top product stream is fed. Preferably, the remaining, non-heated part is fed there as a liquid phase. Before being fed into the distillation section or column, the non-heated part of the first top product stream is preferably cooled by heat exchange with a suitable heat exchange medium. This embodiment, wherein only a part of the first top product stream is heated, leads to a significantly lower cooling duty and decreases the reflux ratio in the first distillation column.

In step (c), the heated first top product stream is subjected to a second distillation step at a pressure lower than 45 bar, yielding thereby a second top product stream comprising methane and a second bottom product stream. The second distillation step is performed at a pressure that is below the critical pressure of methane. The pressure during the second distillation step is preferably higher than 35 bar, such from 35 up to but not including 45 bar, more preferably 38-43 bar, typically around 40 bar. The difference in pressure of the first and second distillation steps is preferably at least 2 bar, more preferably at least 6 bar, typically about 10 bar. It may be necessary to reduce the pressure of the heated first top product stream before entering the distillation column, since the second distillation is performed at a lower pressure. The pressure reduction can conveniently take place in a valve. Preferably, at the top of the second section or second distillation column a partial condenser is used in order to provide the reflux stream.

Similar to the first distillation step, the second distillation step takes place in a second distillation column or a second section of the distillation column. In this latter case, use can be made of a distillation column having sections operating at different pressures, e.g. a dual-pressure distillation column. The internals of the dual-pressure column can be of a tray or packing or a trays plus packing design.

The second top product stream consists essentially of methane and can be used for further purposes in applications where high purity of methane is desired. Preferably, this stream contains at least 98 mol. %, more preferably at least 99 mol. % and most preferably, at least 99.9 mol. % methane.

In step (d) the second bottom product stream is recycled back to the first distillation column or to the first section of the distillation column. Suitably a pump can be used for feeding the second bottom product stream to the distillation column.

The process of the invention can be carried out in any equipment suitable for cryogenic distillation. The distillation columns preferably have from 15 to 30 theoretical stages, calculated as a sum of theoretical stages of the low and the high pressure columns or sections. The refrigerating system required for cryogenic distillation can be of any type provided that it is able to condense the vapour from the low pressure column consisting mainly of methane (with nitrogen if present in the feed stream) at the desired purity and at the equilibrium temperature value at the chosen pressure. The nitrogen, if present, should be separated in a downstream unit.

The process according to the invention allows complete separation of acid gas components from methane by avoiding, at the same time, the drawbacks common to cryogenic distillation such as the build-up of solid carbon dioxide inside the distillation column. In the process of the invention the presence of other impurities, such as higher hydrocarbons —$C_2$, $C_3$— and hydrogen sulphide, make the separation even better due to a better solubility of $CO_2$, which in the end gives less chance of solid $CO_2$ formation.

In addition, the process of the invention is suitable for processing acid gas with high amounts of acid components and in the presence of other impurities such as higher hydrocarbons. The process also allows to obtain the acidic components $CO_2$ and $H_2S$ at a relatively high pressure in the liquid state as the bottom stream of the high pressure section, which is advantageous for further use, e.g. sequestration. The present process is simple and economical as it does not require a third component to be added to the natural gas in order to prevent the build-up of solid carbon dioxide inside the distillation column, which component needs a further step for the separation and recovery.

The invention can also be successfully addressed to the purification of biogas to bio-methane because of the high content of carbon dioxide to be removed.

The invention is further illustrated in the following, non-limiting examples.

EXAMPLES

Example 1

The separation process is arranged as shown in FIG. 1.

Stream 1 at its dew point and at 50 bar with 80% $CO_2$ and 20% $CH_4$ on molar basis is fed to the high pressure section T-1 which is operated at 50 bar. The bottom product from this section is stream 2 which is almost pure $CO_2$ with 0.01% of $CH_4$ on molar basis. This bottom product can be reboiled in a reboiler E-3. The top vapour product is stream 3 with the composition 7.24% molar $CO_2$ and 92.76% molar $CH_4$ at temperature −73.17° C.

If the pressure of this stream 3 was reduced in valve VLV-1 from 50 bar to the pressure of the low pressure section (40 bar) without superheating before entering the valve, the stream at the valve outlet would be at a temperature of about −80.70° C., with the presence of both vapour and liquid phase (the latter with 16% molar fraction of $CO_2$ and 84% molar fraction of $CH_4$). This composition at the temperature of −80.70° C. would lead to the formation of solid $CO_2$. Stream 3 is therefore superheated in E-1 to have a temperature at the outlet of the valve 5° C. higher than the dew point of the mixture at the pressure of 40 bar which results in stream 5 having a temperature of −72.75° C.

Stream 5 from the valve is fed as superheated vapour to the bottom of the low pressure section of the column T-2. The liquid stream 6 from the bottom of the low pressure section is pumped back to the high pressure section T-1. The vapour stream 8 from the top of the low pressure section T-2 is practically constituted by only $CH_4$ (100%). This stream can also be partially condensed in partial condenser E-2.

The number of theoretical stages in the low pressure section (without the partial condenser E-2) is equal to 10 and the number of theoretical stages in the high pressure section (without the reboiler E-3) is equal to 9.

The thermodynamic check on the formation of solid $CO_2$ has been performed following the method proposed in "Application of the Redlich-Kwong-Soave Equation of State to Solid-Liquid Equilibria Calculations", Giorgio Soave, Chemical Engineering Science, 34, 225-229 (1979) and also using routines available in commercial process simulators.

Table 1 shows the composition and characteristics of various streams for Example 1.

Example 2

The separation process is arranged as shown in FIG. 1.

Stream 1 at its dew point and at 51 bar with the following composition: 20 mol. % $CO_2$, 70 mol. % $CH_4$, 4 mol. % $C_2H_6$, 1 mol. % $C_3H_8$, 5 mol. % $H_2S$, is fed to the high pressure section T-1 which operates at 51 bar. The bottom product from this section is stream 2 with composition 66.65 mol. % $CO_2$, 0.0 mol. % $CH_4$, 13.34 mol. % $C_2H_6$, 3.34 mol. % $C_3H_8$, 16.68 mol. % $H_2S$. The top product stream 3 has the following composition: 7.75 mol. % $CO_2$, 90.44 mol. % $CH_4$, 1.28 mol. % $C_2H_6$, 0.01 mol. % $C_3H_8$, 0.53 mol. % $H_2S$. If this stream was laminated from 51 bar to the pressure of the low pressure section (41 bar) without superheating before entering the valve, the stream at the valve outlet would be at a temperature of about −75.66° C., with the presence of both vapour and liquid phase (the latter with the following composition: 19.07 mol. % $CO_2$, 75.32 mol. % $CH_4$, 3.88 mol. % $C_2H_6$, 0.06 mol. % $C_3H_8$, 1.68 mol. % $H_2S$). This composition at the temperature of −76.45° C. would lead to the formation of solid $CO_2$. Therefore superheating is required and the thermal duty has been assigned so to have a temperature at the outlet of the valve VLV-1 5° C. higher than the dew point of the mixture at the pressure of 41 bar. Stream 3 is thus superheated in E-1 to obtain stream 5 with a temperature of −67.14° C.

The stream 5 from the lamination valve is fed as superheated vapour to the bottom of the low pressure section of the column T-2. The liquid stream 6 from the bottom of the low pressure section T-2 is pumped back to the high pressure section T-1 via pump P-1. The vapour stream 8 from the top of the low pressure section is composed of 0.02 mol. % of $CO_2$ and of 99.98 mol. % of $CH_4$.

The number of theoretical stages in the low pressure section (without the partial condenser E-2) is equal to 10 and the number of theoretical stages in the high pressure section (without the reboiler E-3) is equal to 20.

The thermodynamic check on the formation of solid $CO_2$ has been performed following the method proposed in "Application of the Redlich-Kwong-Soave Equation of State to Solid-Liquid Equilibria Calculations", Giorgio Soave, Chemical Engineering Science, 34, 225-229 (1979) and also using routines available in commercial process simulators.

Table 2 shows the composition and characteristics of various streams for Example 2.

TABLE 1

|  | 1 | 2 | 3 | 4 | 5 | 6 | 7 | 8 |
|---|---|---|---|---|---|---|---|---|
| Vapour Fraction | 1.00 | 0.00 | 1.00 | 1.00 | 1.00 | 0.00 | 0.00 | 1.00 |
| Temperature [° C.] | 1.769 | 14.06 | −73.17 | −62.75 | −72.75 | −83.96 | −81.33 | −87.43 |
| Pressure [bar] | 50 | 50 | 50 | 50 | 40 | 40 | 50 | 40 |
| Molar Flow [kgmol/h] | 5000 | 4000 | 1.214e+5 | 1.214e+5 | 1.214e+5 | 1.204e+5 | 1.214e+5 | 999.6 |
| Mole Fractions | | | | | | | | |
| $CO_2$ | 0.8000 | 0.9999 | 0.0724 | 0.0724 | 0.0724 | 0.0730 | 0.0730 | 0.0000 |
| $CH_4$ | 0.2000 | 0.0001 | 0.9276 | 0.9276 | 0.9276 | 0.9270 | 0.9270 | 1.0000 |

TABLE 2

|  | 1 | 2 | 3 | 4 | 5 | 6 | 7 | 8 |
|---|---|---|---|---|---|---|---|---|
| Vapour Fraction | 1.00 | 0.00 | 1.00 | 1.00 | 1.00 | 0.00 | 0.00 | 1.00 |
| Temperature [° C.] | −34.71 | 16.34 | −68.39 | −57.43 | −67.14 | −80.70 | −78.41 | −86.60 |
| Pressure [bar] | 51 | 51 | 51 | 51 | 41 | 41 | 51 | 41 |
| Molar Flow [kgmol/h] | 5000 | 1499 | 1.667e+4 | 1.667e+4 | 1.667e+4 | 1.317e+4 | 1.317e+4 | 3501 |
| Mole Fractions | | | | | | | | |
| $CO_2$ | 0.2000 | 0.6665 | 0.0775 | 0.0775 | 0.0775 | 0.0980 | 0.0980 | 0.0002 |
| $CH_4$ | 0.7000 | 0.0000 | 0.9044 | 0.9044 | 0.9044 | 0.8790 | 0.8790 | 0.9998 |
| $C_2H_6$ | 0.0400 | 0.1334 | 0.0128 | 0.0128 | 0.0128 | 0.0162 | 0.0162 | 0.0000 |
| $C_3H_8$ | 0.0100 | 0.0334 | 0.0001 | 0.0001 | 0.0001 | 0.0001 | 0.0001 | 0.0000 |
| $H_2S$ | 0.0500 | 0.1668 | 0.0053 | 0.0053 | 0.0053 | 0.0067 | 0.0067 | 0.0000 |

Example 3

Figure 2:
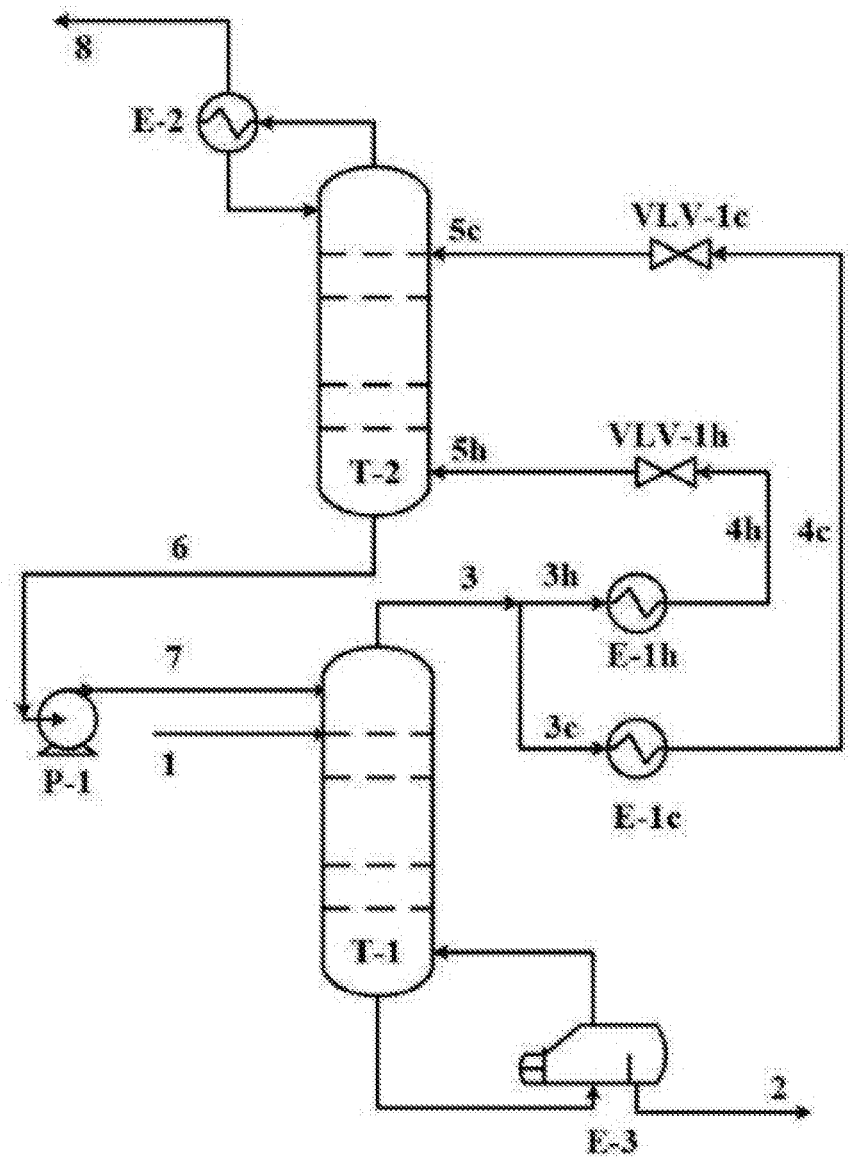
FIG. 2 shows a process scheme for en embodiment according to the invention, wherein the first top product stream is splitted.

The separation process is arranged as shown in FIG. 2.

Stream 1 at its dew point and at 50 bar with 65% $CO_2$ and 35% $CH_4$ on molar basis is fed to the high pressure section T-1 which is operated at 50 bar. The bottom product from this section is stream 2 which is almost pure $CO_2$ with 0.01% of $CH_4$ on molar basis. The top vapour product is stream 3 with the composition 7.32% molar $CO_2$ and 92.68% molar $CH_4$ at temperature −73.07° C.

Stream 3 is split into streams 3h and 3c with a ratio between the flow rates of stream 3h and stream 3 equal to 0.1286. Stream 3h is superheated in E-1h to have a temperature at the outlet of the valve VLV-1h 5° C. higher than the dew point of the mixture at the pressure of 40 bar which results in stream 5h having a temperature of −72.60° C. Stream 5c is cooled in E-1c to reach the boiling point temperature of the mixture at the pressure of 40 bar at the outlet of the valve VIN-1c which results in a temperature of −83.95° C.

Stream 5h from the lamination valve VLV-1h is fed as superheated vapour to the bottom of the low pressure section of the column. T-2. Stream 5c from the lamination valve VLV-1c is fed as liquid at the boiling point to the 12th tray from the top of the low pressure section of the column T-2. The liquid stream 6 from the bottom of the low pressure section is pumped back to the high pressure section T-1. The vapour stream 8 from the top of the low pressure section T-2 is practically constituted by only $CH_4$ (99.79% molar).

The number of theoretical stages in the low pressure section (without the partial condenser) is equal to 15 and the number of theoretical stages in the high pressure section (without the reboiler) is equal to 20.

This configuration leads to a significantly lower cooling duty (from 62 MW to 15.9 MW).

The thermodynamic check on the formation of solid $CO_2$ has been performed following the method proposed in "Application of the Redlich-Kwong-Soave Equation of State to Solid-Liquid Equilibria Calculations", Giorgio Soave, Chemical Engineering Science, 34, 225-229 (1979) and also using routines available in commercial process simulators.

Table 3a and 3b show the composition and characteristics of various streams for Example 3.

TABLE 3a

| Name | 1 | 2 | 3 | 3h | 3c | 4h | 4c |
|---|---|---|---|---|---|---|---|
| Vapour Fraction | 1 | 0 | 1 | 1 | 1 | 1 | 0 |
| Temperature [° C.] | −8.106 | 14.06 | −73.07 | −73.07 | −73.07 | −62.61 | −81.93 |
| Pressure [bar] | 50 | 50 | 50 | 50 | 50 | 50 | 50 |

TABLE 3a-continued

| Molar Flow [kgmol/h] | 5000 | 3247 | 1.987e+4 | 2556 | 1.732e+4 | 2556 | 1.732e+4 |
|---|---|---|---|---|---|---|---|
| Name | | | Mole Fractions | | | | |
| $CO_2$ | 0.65 | 0.9999 | 0.0732 | 0.0732 | 0.0732 | 0.0732 | 0.0732 |
| $CH_4$ | 0.35 | 0.0001 | 0.9268 | 0.9268 | 0.9268 | 0.9268 | 0.9268 |

TABLE 3b

| Name | 5h | 5c | 6 | 7 | 8 |
|---|---|---|---|---|---|
| Vapour Fraction | 1 | 0 | 0 | 0 | 1 |
| Temperature [° C.] | −72.60 | −83.95 | −83.66 | −81.10 | −87.22 |
| Pressure [bar] | 40 | 40 | 40 | 50 | 40 |
| Molar Flow [kgmol/h] | 2556 | 1.732e+4 | 1.812e+4 | 1.812e+4 | 1753 |
| Name | | | Molar fractions | | |
| $CO_2$ | 0.0732 | 0.0732 | 0.08 | 0.08 | 0.0021 |
| $CH_4$ | 0.9268 | 0.9268 | 0.92 | 0.92 | 0.9979 |

Example 4

Figure 3:
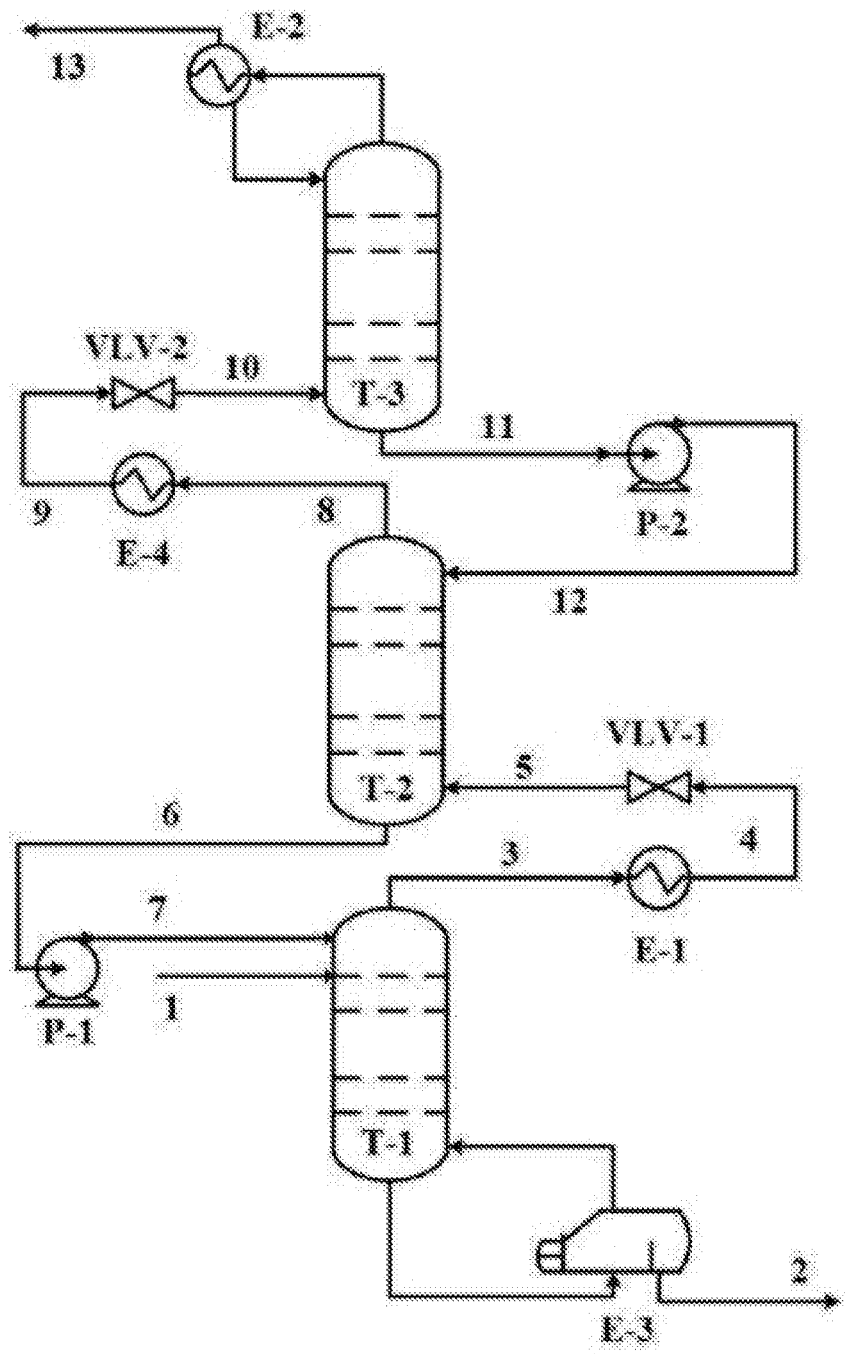
FIG. 3 shows a process scheme for an embodiment according to the invention, with three columns.

FIG. 3 shows an embodiment of the invention with 3 distillation columns wherein a third column is added between the first and second column, the third column operating at a temperature and pressure between the temperature and pressure of the first and second column.

The invention claimed is:

1. A method for the removal of carbon dioxide ($CO_2$) from a feed mixture comprising methane and carbon dioxide ($CO_2$), the method comprising a first distillation step and a second distillation step:
   (a) subjecting the feed mixture to the first distillation step in a first distillation column or a first section of a distillation column, at a first distillation pressure of at least 45 bar, yielding after said first distillation a first bottom product stream comprising $CO_2$ and a first top product stream comprising $CO_2$ and methane,
   (b) splitting said first top product stream into a first part and a second part, heating the first part of said first top product stream to yield a first heated part of said first top product stream, cooling the second part of said first top product stream by heat exchange with a heat exchange medium to yield a second cooled part of said first top product stream, followed by
   (c) reducing the pressure of said first heated part of the first top product stream to provide a second distillation feed stream, and thereafter subjecting said second distillation feed stream to the second distillation step in a second distillation column or a second section of the distillation column, at a second distillation pressure, wherein said second distillation pressure is lower than 45 bar, yielding thereby a second top product stream comprising methane and a second bottom product stream,
   (d) feeding said second bottom product stream to said first distillation column or said first section of the distillation column,
   (e) feeding said second cooled part of said first top product stream to said second distillation column or a second section of the distillation column,
   wherein said second distillation feed stream has a dew point temperature at said second distillation pressure,
   wherein said heating in step (b) results in a temperature of said second distillation feed stream higher than said dew point temperature of said second distillation feed stream at said second distillation pressure,
   and wherein said reducing of pressure of step (c) is carried out while the temperature of the said first heated part of the first top product stream is higher than said dew point temperature of said second distillation feed stream at said second distillation pressure.

2. The method according to claim 1, wherein the first heated part in (b) is at least 10 mol. % of the first top product stream.

3. The method according to claim 1, wherein the said part that is not heated in step (b) is fed to the second distillation column or the second section of the distillation column as a liquid phase.

4. The method according to claim 1, wherein the feed mixture enters the first distillation step at a feed mixture entry pressure and a feed mixture temperature, wherein the feed mixture has a feed mixture dew point temperature at said feed mixture entry pressure, and wherein said feed mixture temperature is equal to or lower than said feed mixture dew point temperature.

5. The method according to claim 1, wherein the first distillation pressure is in the range of 45-55 bar.

6. The method according to claim 1, wherein the second distillation pressure is higher than 35 bar.

7. The method according to claim 1, wherein in step (b) the first heated part of the first top product stream is heated to a temperature that is between 1 and 10° C. higher than the dew point of the first part of the first top product stream at the second distillation pressure.

8. The method according to claim 1, wherein the first distillation pressure and second distillation pressure differ by at least 2 bar.

9. The method according to claim 1, wherein the second top product stream comprises at least 98 mol. % methane.

10. The method according to claim 1, wherein the second top product stream is partially condensed in a partial condenser.

11. The method according to claim 1, wherein the first bottom product stream is reboiled in a reboiler before entering the first distillation column or the first section of the distillation column.

12. The method according to claim 1, wherein the distillation steps are performed in a distillation column, wherein said distillation column is a dual-pressure distillation column having internals with a tray or packing design.

13. The method according to claim 1, wherein the reducing of pressure in step (c) is by means of a valve and wherein the temperature at the outlet of the valve is between 3 and 8° C. higher than said dew point of the second distillation feed stream.

* * * * *